Nov. 10, 1931.  C. M. ANGLEMYER  1,831,282
FRICTION CLUTCH
Filed May 28, 1928
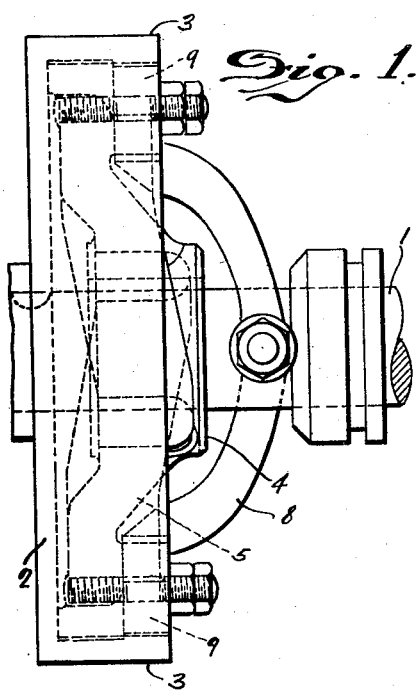
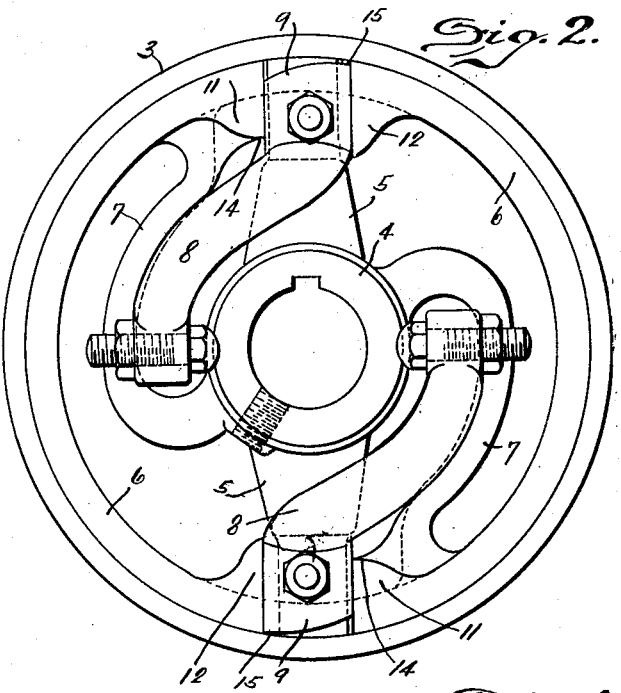
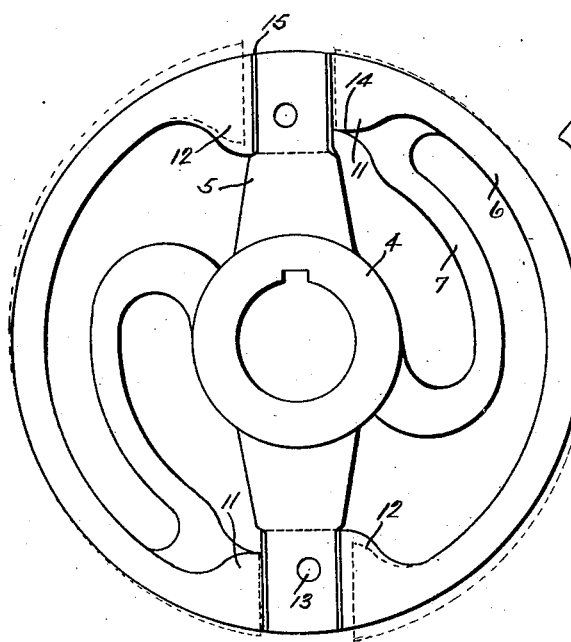
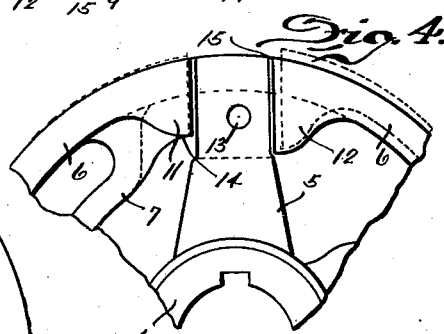
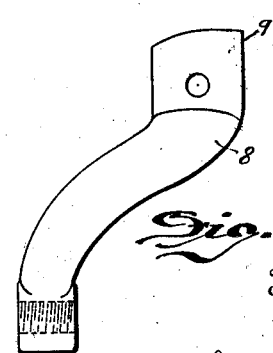
Inventor Patented Nov. 10, 1931

1,831,282

UNITED STATES PATENT OFFICE

CARL M. ANGLEMYER, OF DAYTON, OHIO, ASSIGNOR TO THE EDGEMONT MACHINE COMPANY, OF DAYTON, OHIO, A CORPORATION OF OHIO

FRICTION CLUTCH

Application filed May 28, 1928. Serial No. 281,044.

My invention relates to friction clutches, and more particularly to an improvement and further development of the friction clutch shown and described in Patent No. 1,085,765 of Feb. 3, 1914, to George Stahl wherein segmental clutch segments are expanded into engagement with an enclosing member by levers interposed between their ends.

While the clutch construction illustrated in such patent has been found to be quite efficient in operation and positive in its action as well as economical for manufacture, it has been found somewhat difficult to operate and does not effect a quick release but possesses a tendency for the clutch segments to drag upon the complementary member due to centrifugal influence at high speed.

The purpose of the present invention is to correct the faults and overcome the objectionable features of the patented construction by so proportioning and disposing the operating levers between the adjacent ends of the clutch segments and pre-tensioning the clutch segments under constant tension thereby initially flexing said tensioned clutch segments to eccentric form from which they are subsequently machined concentric with the axis of the clutch and by so proportioning the adjacent ends of the clutch segments that the operating levers will effect equal expansion. The fact that the end of each segment most susceptible to centrifugal influence is under constant tension even when the clutch is released enables it to resist such centrifugal tendency and the variation of leverage of the operating arms upon the adjacent sections enables the arm to overcome such inherent tension and expand the two sections more uniformly.

The object of the invention is to provide an improved friction clutch construction which will be more efficient in operation, uniform in action, easily operated, capable of effecting a quick and clear release and unlikely to get out of repair.

A further object of the invention is to improve the action and provide an improved method of operating the clutch means disclosed in the aforementioned Letters Patent.

With the above primary and other incidental objects in view as will more fully appear in the specification, the invention consists of the features of construction, the parts and combinations thereof, and the mode of operation, or their equivalents, as hereinafter described and set forth in the claims.

Referring to the accompanying drawings wherein is shown the preferred, but obviously not necessarily the only form of embodiment of the invention, Fig. 1 is an end elevation of the clutch embodying the present invention. Fig. 2 is a side elevation thereof.

Fig. 3 is a reverse view of the expansible clutch element. Fig. 4 is an enlarged detail view of a portion of the expansible clutch element. Fig. 5 is a detail view of one of the operating arms.

Like parts are indicated by similar characters of reference throughout the several views.

Referring to the drawings, 1 is the shaft upon which is loosely mounted a complementary clutch member including a web portion 2 and annular flange 3 within which the coupling portion of the clutch is expansible.

The expansible clutch element comprises a hub portion 4 having radially disposed driving arms 5, at the opposite sides of which are located arcuate spring arms 7 which support clutch segments 6. The curvature of the clutch segments 6 agrees with that of the interior of the annular flange 3 of the complementary clutch member. The ends of the clutch segments 6 approach quite closely to, but are independent of the driving arms 5. Through the resiliency of the clutch segments 6 and their supporting spring arms 7 such segments may be pressed into frictional contact with the interior of the annular flange 3 by means of operating arms 8 pivoted to the driving arms 5 intermediate the ends of such clutch segments 6. The arms 5 being of less thickness than the clutch segments 6 the ends 9 of the operating levers 8 extend intermediate the adjacent ends of the clutch segments 6 and simultaneously abut upon both clutch segments. The operating arms 8 are oscillated by means of a cam collar slidable upon the shaft 1. Such is the patented construction before referred to, which forms no part of the present invention per se.

To overcome the objectionable features of the patented construction before mentioned the ends 9 of the operating levers 8 are made of somewhat greater width than the normal distance between the adjacent ends 11 and 12 of the clutch segments 6. At the same time the hole 13 in the driving arm 5 for the pivotal stud of the operating lever 8 is preferably offset from the exact medial line between the adjacent ends 11 and 12 of the clutch segments 6, whereby it is slightly closer to the end 12 than to the end 11 of said clutch segments. By this arrangement when the head 9 of the operator arm 8 is introduced between the adjacent ends 11 and 12 of the clutch segments 6 the end 12 is forced laterally out of its normal position into a somewhat eccentric position as shown by dotted lines in Fig. 4, thereby placing the clutch segments 6 under tension. It is this free end 12 of the clutch segment which possesses the greatest tendency to distort or flex under centrifugal influence and therefore drag upon the complementary clutch member. By introducing the head 9 of the operator arm of somewhat greater width than the normal distance between the ends 11 and 12 of the clutch segments the segments are placed under initial tension and it requires a greater centrifugal influence to effect a further distortion or flexing of such clutch segments. In other words these sections are placed under sufficient initial tension to enable them to resist the centrifugal influence. Such flexing of the clutch segments by the introduction of the enlarged head 9 of the operating lever 8 causes the segments to assume a somewhat eccentric peripheral outline. The clutch element is then machined or turned with its clutch segments in their distended or tensioned position until their peripheral surface is reduced to concentric relation with the center of the hub 4.

Each frictional clutch segment is attached closely adjacent to its end 11 with the supporting spring arm 7. It is this condition which leaves the opposite end 12 free to flex outwardly under centrifugal influence unless pretensioned as before mentioned, sufficiently to resist such influence. This tensioning is effected by distorting the segments 6 by displacement of their ends 12 to permit the insertion therebetween of the heads 9 of the arms 8, without however materially displacing the ends 11 of such clutch segments 6. When fully relaxed, that is when the arms 8 are removed the free ends 12 of the clutch segments approach more closely to the pivotal stud opening 13 than do the ends 11, but when the adjustment arms are inserted in inoperative position these ends 11 and 12 are substantially equally spaced from the center of oscillation of the arm, the difference of spacing being compensated for by displacement of the free ends 12 of the clutch segments. The eccentric distortion of the clutch segments 6 being removed by subsequent machining to a periphery concentric with the hub center, the ends of the clutch segments remain under substantially equalized tension, or are substantially equally resistant to centrifugal influence and to the expanding influence of the adjusting levers.

In expanding the clutch segments they are subjected to a longitudinal compression by which the segments 6 are given a buckling tendency simultaneously with their radial distention against the yielding resistance of the spring arms. To effect such adjustment and apply the pressure substantially evenly throughout the circle of operation, the actuating levers 8 are made to operate upon the ends 12 of the sections through greater leverage and in a somewhat different direction from that upon the ends 11. To effect such adjustment the end 11 of each section is somewhat shortened in a radial direction so that the bearing point 14 is brought closer to and more nearly opposite the center of oscillation of the actuating lever and the pressure upon this point will be more nearly in a radial direction exerting an expansive tendency against the yielding resistance of the spring arm 7 while at the same time opposing the longitudinal pressure applied at the opposite end of the clutch segment.

The engagement of the lever with the end 12 at the point 15 is farther removed from the center of oscillation of the lever and consequently effects a greater deflection, and the pressure is applied, not radially as upon the end 11, but substantially longitudinally of the segment. The resultant of this longitudinal compression in combination with the substantially radial pressure applied at the opposite end of the clutch segment upon the end 11 is a substantially uniform expansive pressure throughout the extent of the segment.

The inherent retractive tension of the clutch segments 6 is sufficient to effect the immediate disengagement of the clutch segments from the clutch member upon the release of the operating arms 8. Such inherent tension under which the clutch segments 6 are placed is also sufficient to normally resist the centrifugal influence to which the clutch segments are subjected while rotating at high speed and by shortening the end 11 and thereby shortening the operating radius of operation or leverage upon the end 11 of the tensioned segment, it tends to equalize the expansion of the unit and cause the clutch segments 6 to exert uniform pressure within the complementary member.

From the above description it will be apparent that there is thus provided a construction of the character described, possessing the particular features of advantage before enumerated as desirable, but which obviously is susceptible of modification in its form, proportions and arrangement of parts without departing from the principle involved or sacrificing any of its advantages.

While in order to comply with the statute the invention is described in language more or less specific as to structural features it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A friction clutch wherein a plurality of segmental clutch sections are flexibly connected with a driver member and distended into engagement with a driven member by an operating lever, characterized by an operating lever pivoted to the driver intermediate the adjacent ends of the segments and simultaneously engaging adjacent ends of different segments at different distances from the pivotal point of the lever, said segment ends being normally under inherent tension to different degree, the effective leverage of the operating lever being greater upon one segment end than upon the other segment end to compensate for variation of resistance and equalize the expansion of the unit.

2. In a friction clutch of the character described, an annular clutch member, a pair of segmental friction members engageable therewith, supporting means therefor, operating levers interposed between the adjacent ends of the segments and operating to flex said segments into contact with the complementary clutch member, the adjacent ends of the segments being subject to unequal inherent tension whereby one end of each segment possesses greater contractile tendency than the other, substantially as specified.

3. In a friction clutch of the character described, an annular clutch member, a pair of segmental friction members engageable therewith, supporting means therefor, operating levers interposed between the adjacent ends of the segments and operating to flex said segments into contact with the complementary clutch member, said operating levers and adjacent ends of the segments being so disposed that each lever exerts different degrees of pressure upon the adjacent ends of the respective segments.

4. The herein described method of shaping friction clutch elements having yielding contact segments, consisting in placing the segments under tension whereby they will be distorted out of normal position and while so distorted reducing the peripheral faces of the segments to concentric relation with the axis of the clutch.

5. The herein described method of adapting friction clutch elements having yielding contact segments, the ends of which are spaced one from the other and simultaneously engaged by an intermediate operating lever, consisting in subjecting the adjacent ends of the segments to dissimilar tension and proportioning the leverage of the operating lever upon the adjacent section ends unequally to compensate for the difference of tension whereby the clutch element may be expanded uniformly.

6. A clutch including resilient segmental sections having their ends disposed in spaced relation, and an operating lever interposed therebetween for simultaneous operative engagement, the end of one section possessing a contractile tendency greater than the end of the other section and limited by the interposed lever, the bearing points of said lever with the respective segment ends being disposed at different distances from the pivotal center of the lever to afford dissimilar expansive pressures upon the segments.

7. A friction clutch including yieldingly mounted segments and an operating lever positioned intermediate the adjacent ends of the segments, the interposed end of the lever being of greater width than the normal distance between the adjacent ends of the segments, the adjacent portion of one of the segments being flexed to greater degree than the other to accommodate the lever therebetween, thereby maintaining such segment normally under tension.

8. A friction clutch including yieldingly mounted segments and an operating lever positioned intermediate the adjacent ends of the segments, the adjacent portion of one of the segments being maintained under greater contractive tendency than the other to compensate for centrifugal influence.

9. In a friction clutch of the character described, an annular clutch member, segmental friction members arranged end to end for expansive engagement with the annular clutch member, resilient supporting arms connected with the segments adjacent to one end thereof, the segments being subjected to inherent contractive tension whereby the resistance to expansion of the supported and free ends of said segments will be substantially equalized, and actuating levers interposed between the adjacent ends of the succeeding segments.

10. In a friction clutch of the character described, an annular clutch member, a plurality of segmental contact members arranged end to end for expansive engagement with the annular clutch member, means for yieldingly supporting said segments, said segments being tensioned whereby one end of each segment possesses a tendency to approach closer to the common center than the opposite end of such segment, and actuating arms normally limiting such approach and subjecting the adjacent ends of succeeding segments to simultaneous pressure.

11. In a friction clutch of the character described, a plurality of segmental contact members for expansive engagement with an enclosing complementary member, means for yieldingly supporting said segments unequally at their opposite ends whereby one end is normally more resistant to deflection than the other, and means for subjecting the more yielding ends of the segments to normal inherent tension whereby the resistance to subsequent deflection will be equalized.

12. A friction clutch including an annular member, a plurality of segmental friction members yieldingly mounted within the annular member for expansive engagement therewith, said segments being normally under contractive tension sufficient to resist centrifugal influence, the opposite ends of the segments being resistant to different degrees to expansive influence, and means for applying expansive pressure unequally to the segments to effect substantially uniform expansion thereof.

13. A friction clutch including an annular member, a plurality of segmental friction members yieldingly mounted within the annular member for expansive engagement therewith, and operating levers interposed between adjacent ends of succeeding segments and exerting simultaneously unequal pressure upon the adjacent ends of succeeding segments, each segment being subjected to unequal pressure at its opposite ends, and means for actuating the levers.

14. A friction clutch including an annular member, a plurality of segmental friction members yieldingly mounted within the annular member for expansive engagement therewith, said segments being normally under contractive tension sufficient to resist centrifugal influence, and operating levers interposed between the adjacent ends of the segments and exerting expansive pressure upon the segments to expand them into frictional engagement with the annular member, and means for actuating the levers.

15. A friction clutch including an annular member, a plurality of segmental friction members yieldingly mounted within the annular member for expansive engagement therewith, the opposite ends of the segments being unequally resistant to expansive influence, operating levers interposed between the adjacent ends of succeeding segments, said levers exerting unequal expansive influence upon the opposite ends of each segment, and means for actuating the levers in unison.

In testimony whereof, I have hereunto set my hand this 3rd day of May, A. D. 1928.

CARL M. ANGLEMYER.